(12) United States Patent
Kudo

(10) Patent No.: US 12,556,614 B2
(45) Date of Patent: Feb. 17, 2026

(54) MESSAGING SYSTEM, NON-TRANSITORY COMPUTER READABLE MEDIUM, AND MESSAGING METHOD

(71) Applicant: FUJIFILM BUSINESS INNOVATION CORP., Tokyo (JP)

(72) Inventor: Yoshihiro Kudo, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 512 days.

(21) Appl. No.: 17/885,685

(22) Filed: Aug. 11, 2022

(65) Prior Publication Data

US 2023/0254380 A1 Aug. 10, 2023

(30) Foreign Application Priority Data

Feb. 10, 2022 (JP) .................................. 2022-019539

(51) Int. Cl.
*H04L 51/52* (2022.01)
*H04L 51/04* (2022.01)
*H04L 67/306* (2022.01)

(52) U.S. Cl.
CPC ............ *H04L 67/306* (2013.01); *H04L 51/04* (2013.01)

(58) Field of Classification Search
None
See application file for complete search history.

(56) References Cited

U.S. PATENT DOCUMENTS

| 10,163,173 | B1* | 12/2018 | McKinley | ............ G06F 3/0484 |
| 10,554,742 | B2 | 2/2020 | Aoki et al. | |
| 10,771,257 | B1* | 9/2020 | de Matos | ........... G06Q 20/3825 |
| 2012/0166964 | A1* | 6/2012 | Tseng | ...................... G06F 3/048 |
| | | | | 715/745 |
| 2013/0198179 | A1* | 8/2013 | Arnott | .................... G06Q 10/06 |
| | | | | 707/E17.014 |
| 2014/0040029 | A1* | 2/2014 | Vhora | .................. H04L 67/535 |
| | | | | 705/14.54 |
| 2015/0332067 | A1* | 11/2015 | Gorod | .................. G06F 3/0484 |
| | | | | 726/26 |

(Continued)

FOREIGN PATENT DOCUMENTS

| JP | 5903011 B2 | 4/2016 |
| JP | 2017-536628 A | 12/2017 |

(Continued)

OTHER PUBLICATIONS

Jun. 14, 2023 Search Report issued in European Patent Application No. 22199311.6.

(Continued)

*Primary Examiner* — Christopher B Robinson
(74) *Attorney, Agent, or Firm* — Oliff PLC

(57) ABSTRACT

A messaging system includes: a memory that stores multiple profile photos of a user, the profile photos being different from each other; and a processor configured to, by running a program: select a profile photo from among the multiple profile photos as a profile photo of a message-transmission-source user on a basis of user information regarding a message-transmission-destination user; and display the selected profile photo to the message-transmission-destination user in transmitting a message from the message-transmission-source user.

20 Claims, 13 Drawing Sheets

(56) References Cited

U.S. PATENT DOCUMENTS

| | | | | |
|---|---|---|---|---|
| 2016/0027079 A1* | 1/2016 | Schoeffler | ............... | H04L 63/12 |
| | | | | 705/325 |
| 2016/0226805 A1* | 8/2016 | Marovets | .............. | H04L 67/306 |
| 2017/0346772 A1 | 11/2017 | Albouyeh et al. | | |
| 2018/0101774 A1* | 4/2018 | Werris | .................. | G06N 20/00 |
| 2018/0213056 A1 | 7/2018 | Chau et al. | | |
| 2019/0163333 A1 | 5/2019 | Kogan | | |
| 2020/0134031 A1 | 4/2020 | Wallis et al. | | |
| 2021/0352030 A1* | 11/2021 | Maarek | .................. | G06V 20/30 |

FOREIGN PATENT DOCUMENTS

| | | |
|---|---|---|
| JP | 6348622 B2 | 6/2018 |
| JP | 2021-528710 A | 10/2021 |

OTHER PUBLICATIONS

Aug. 5, 2025 Office Action issued in Japanese Patent Application No. 2022-019539.

Oct. 28, 2025 Office Action issued in Japanese Patent Application No. 2022-019539.

\* cited by examiner

FIG. 4
18
| USER ID | USER INFORMATION | PROFILE PHOTO ID |
|---|---|---|
| 10000 | NAME, COMPANY, DEPARTMENT, .. | 20000 |
| 10001 | NAME, COMPANY, DEPARTMENT, .. | 20001 |
FIG. 5
20
| DEFAULT | PROFILE PHOTO 1 | PROFILE PHOTO 2 | |
|---|---|---|---|
|  |  |  | |

| ITEM | CONDITION | PROFILE PHOTO |
|---|---|---|
| COMPANY | SAME | PHOTO 1 |
| | DIFFERENT | DEFAULT |
| DEPARTMENT | SAME | PHOTO 2 |
| | DIFFERENT | DEFAULT |
| COMMUNICATION COUNT | ≥ THRESHOLD | PHOTO 2 |
| | < THRESHOLD | DEFAULT |

FIG. 10A
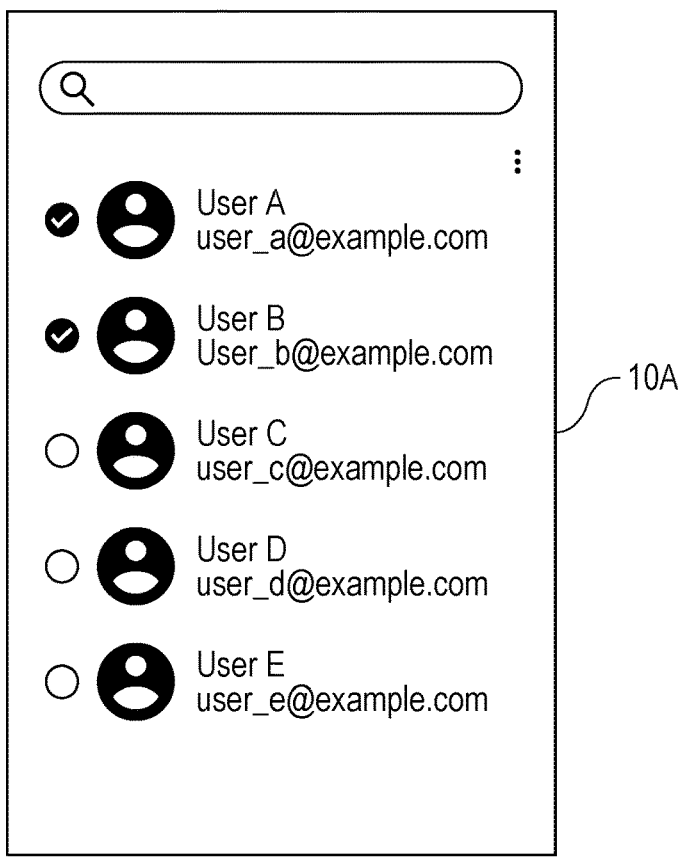
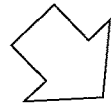
FIG. 10B
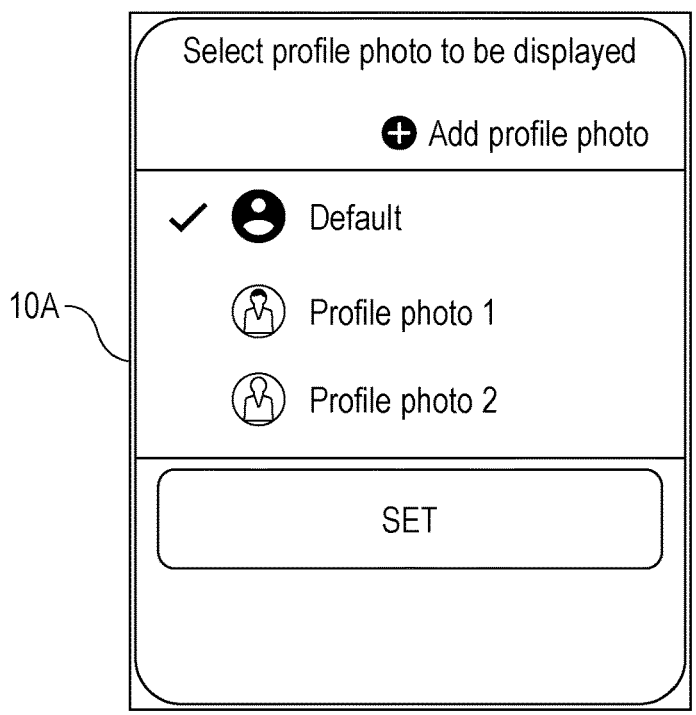

MESSAGING SYSTEM, NON-TRANSITORY COMPUTER READABLE MEDIUM, AND MESSAGING METHOD

CROSS-REFERENCE TO RELATED APPLICATIONS

This application is based on and claims priority under 35 USC 119 from Japanese Patent Application No. 2022-019539 filed Feb. 10, 2022.

BACKGROUND

(i) Technical Field

The present disclosure relates to a messaging system, a non-transitory computer readable medium, and a messaging method.

(ii) Related Art

Japanese Patent No. 6348622 describes an information processing system capable of controlling the name of a user to be disclosed to a different user on the basis of a relationship with the different user. The information processing system includes a user management server and client apparatuses used by respective users. The user management server includes a user information memory in which for each user, an identification name for uniquely identifying the user, a limitedly disclosed name registered by the user, information for identifying one or more permitted-disclosure users who are included in the respective users of the client apparatuses and to whom the limitedly disclosed name are permitted to be disclosed are stored in association with each other. Each client apparatus includes an application execution unit and a user-information request unit. The application execution unit runs application programs. The user-information request unit transmits, to the user management server, an acquisition request for information regarding the name of a request target user in response to an instruction from the application execution unit, the acquisition request including information identifying a requesting user who uses the client apparatus. The user management server further includes a user-information-request receiving unit and a user-information transmission unit. The user-information-request receiving unit receives the acquisition request for the name information from the client apparatus. If the requesting user has been registered as the permitted-disclosure user regarding the request target user, the user-information transmission unit transmits the disclosure-restricted name of the request target user as a reply to the acquisition request. The application execution unit displays the information regarding the name of the request target user on the display screen in accordance of the content of the information transmitted from the user-information transmission unit.

Japanese Patent No. 5903011 describes an apparatus that reduces issues with sender information in transmitting a message. The apparatus is a terminal apparatus that provides messages transmitted from respective users to enable the messages to be viewed from a display. The apparatus includes a setting unit, a management unit, a transmission unit, and a display controller. The setting unit sets pieces of profile information for respective different pieces of sender information of a user. The management unit manages transmission-destination users in such a manner as to associate each transmission-destination user with one of the different pieces of sender information. The transmission unit transmits a message to some or all of the users each associated with a corresponding one of the different pieces of sender information, the piece of sender information being attached to the message. The display controller causes the message to be displayed on the display.

SUMMARY

A technology for changing the content of a setting of profile information regarding the transmission source of a message from the viewpoint of privacy protection is known. The content is changed on the basis of the transmission destination of the message. However, the profile photo of the transmission source of the message does not very.

Aspects of non-limiting embodiments of the present disclosure relate to providing a technology for using more appropriate profile photo of a message-transmission-source user as compared with a case where the profile photo is used without variation.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a messaging system including: a memory that stores multiple profile photos of a user, the profile photos being different from each other; and a processor configured to, by running a program: select a profile photo from among the multiple profile photos as a profile photo of a message-transmission-source user on a basis of user information regarding a message-transmission-destination user; and display the selected profile photo to the message-transmission-destination user in transmitting a message from the message-transmission-source user.

BRIEF DESCRIPTION OF THE DRAWINGS

An exemplary embodiment of the present disclosure will be described in detail based on the following figures, wherein:

FIG. 4 is a table for explaining user information according to the exemplary embodiment;

FIG. 5 is a view for explaining profile photos according to the exemplary embodiment;

FIGS. 10A and 10B are views for explaining the setting of the profile photos according to the exemplary embodiment;

DETAILED DESCRIPTION

Hereinafter, an exemplary embodiment of the present disclosure will be described on the basis of the drawings. A messaging service by which users exchange messages in the chat room is taken as an example.

Overall System Configuration

Figure 1:
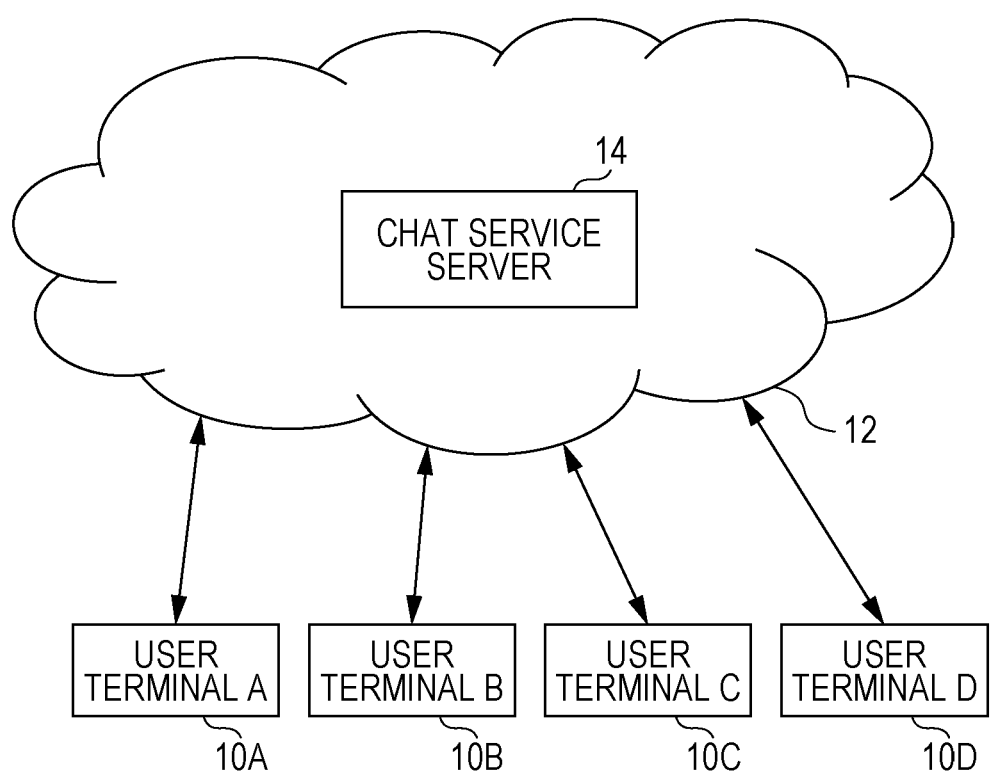
FIG. 1 is a configuration diagram of a system according to an exemplary embodiment.

FIG. 1 is a diagram of the overall configuration of a messaging system that implements a messaging service in the exemplary embodiment. The messaging system includes user terminals A (10A) to D (10D) and a chat service server 14 in a cloud system 12.

The user terminals A (10A) to D (10D) are used by users of the messaging service and are information terminals such as a smartphone, a tablet terminal, or a personal computer (PC). Although FIG. 1 illustrates the four user terminals that are the user terminal A (10A), the user terminal B (10B), the user terminal C (10C), and the user terminal D (10D), any number of user terminals may be used. Each user accesses the chat service server 14 in the cloud system 12 by operating a corresponding one of the user terminals A (10A) to D (10D) and exchanges messages from a different user other than the user. In the following description, a user A operates the user terminal A; a user B, the user terminal B; a user C, the user terminal C; and a user D, the user terminal D. The user terminals A (10A) to D (10D) are connected to the chat service server 14 to be able to transmit and receive data via a wired or wireless communication network. The communication network is, for example, the Internet but may be a dedicated network.

The chat service server 14 is a cloud server in the cloud system 12 and provides the chat service. The chat service server 14 is configured from one or more server computers. The chat service server 14 performs overall processing related to message exchange such as message transmission and reception between the user terminals A to D and displaying a display screen for transmitting and receiving a message. The chat service server 14 is capable of processing the message exchange not only between two users but also in a group formed by three or more users (group chat).

Chat Service Server Configuration

Figure 2:
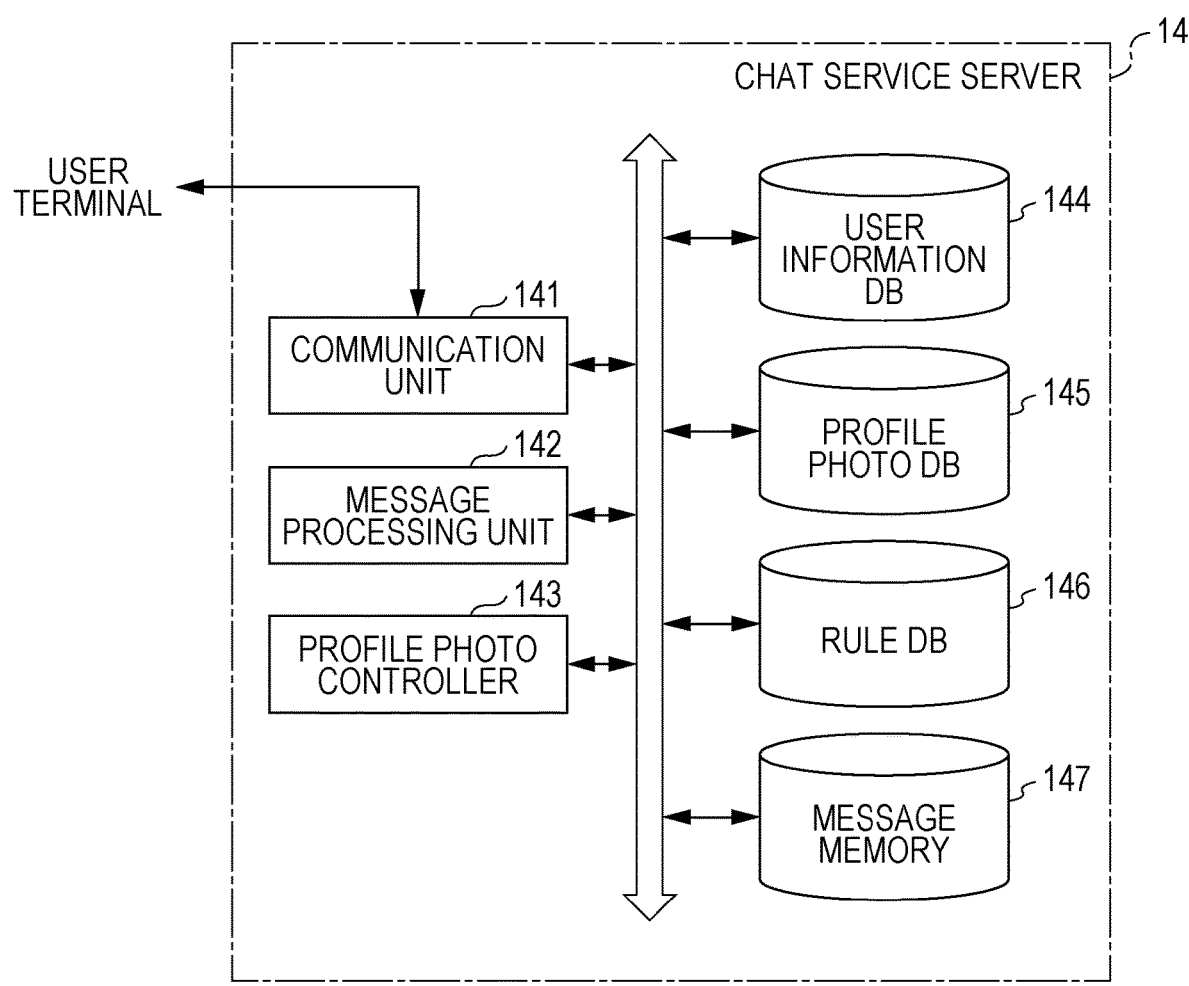
FIG. 2 is a functional block diagram of a chat service server according to the exemplary embodiment.

FIG. 2 is a functional block diagram of the chat service server 14. The chat service server 14 includes, as functional blocks, a communication unit 141, a message processing unit 142, a profile photo controller 143, a user information database (DB) 144, a profile photo DB 145, a rule DB 146, and a message memory 147.

The communication unit 141 communicates with the user terminals 10A to 10D. The communication unit 141 outputs, to the message processing unit 142, a message received from any of the user terminals 10A to 10D. The communication unit 141 also transmits, to any of the user terminals 10A to 10D, a message from the message processing unit 142.

The message processing unit 142 receives the message from the communication unit 141 and identifies a transmission-source user of the message and a transmission-destination user of the message. The message processing unit 142 outputs the message-transmission-source user and the message-transmission-destination user thus identified to the profile photo controller 143. The message processing unit 142 stores the received message in the message memory 147. The message processing unit 142 transmits the received message to the message-transmission-destination user via the communication unit 141.

The profile photo controller 143 performs changing control of the profile photo of the message-transmission-source user on the basis of user information regarding the identified message-transmission-destination user. Specifically, when the message processing unit 142 transmits, to the message-transmission-destination user, the message having the profile photo of the message-transmission-source user attached thereto, the profile photo controller 143 dynamically changes the profile photo attached to the message on the basis of the user information regarding the message transmission destination, without using a fixed profile photo set in advance.

The user information DB 144 stores a table of user information regarding the users of the chat service server 14. Examples of the user information include a user ID, the name of a user, an organization to which the user belongs. The profile photo controller 143 performs the changing control of the profile photo in such a manner as to access the user information DB 144 and acquire user information regarding the user.

The profile photo DB 145 stores the profile photos of the users. Each user has one or more profile photos. If the user has one profile photo, the changing control is not performed. If the user has profile photos, the profile photo controller 143 performs the changing control in such a manner as to adaptively select one of the profile photos on the basis of the user information regarding the message-transmission-destination user.

The rule DB 146 stores rules used when the profile photo controller 143 performs the changing control of the profile photos. The profile photo controller 143 selects a profile photo according to a rule stored in the rule DB 146 on the basis of the user information regarding the message transmission destination. The rules have been set in advance but may be set by the user individually.

The message memory 147 stores received messages serially.

Figure 3:
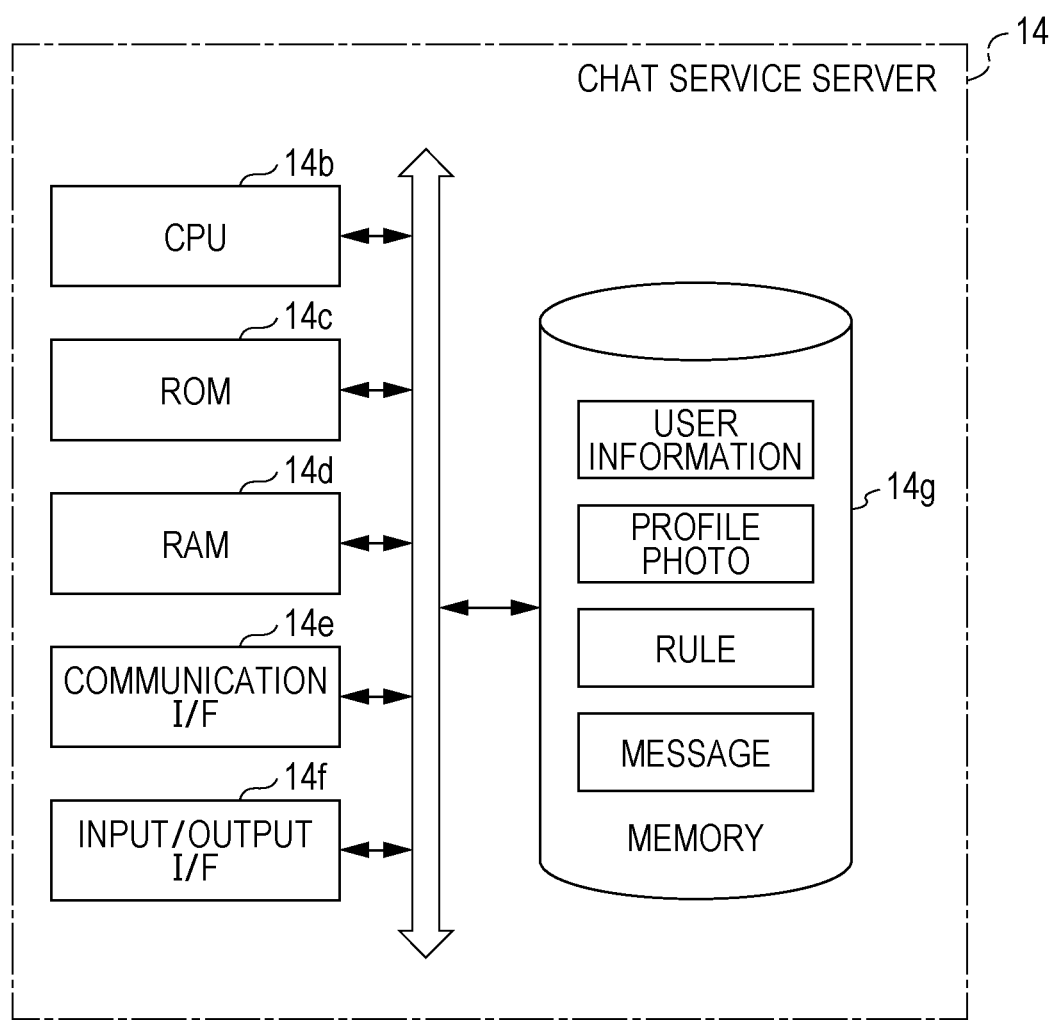
FIG. 3 is a configuration block diagram of the chat service server according to the exemplary embodiment.

FIG. 3 illustrates a configuration block diagram of the chat service server 14. The chat service server 14 is configured from one or more server computers and one or more CPUs 14b, a ROM 14c, a RAM 14d, a communication interface (I/F) 14e, an input/output I/F 14f, and a memory 14g.

Each CPU 14b implements the functions of the chat service in such a manner as to read out a program stored in the ROM 14c or the memory 14g and use the RAM 14d as a working memory. The CPU 14b implements the message processing unit 142 and the profile photo controller 143 in FIG. 2.

The communication I/F 14e exchanges messages with the user terminals 10A to 10D.

The input/output I/F 14f transmits and receives data to and from an input device such as a keyboard or a mouse and an output device such as a display.

The memory 14g is composed of a non-volatile memory such as a hard disk drive (HDD) or a solid state drive (SSD).

The memory 14g stores not only programs but also the user information table, a profile photo table, a rule table, and a message management table. The memory 14g implements, as memories, the user information DB 144, the profile photo DB 145, the rule DB 146, and the message memory 147 in FIG. 2.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

FIG. 4 illustrates an example user information table stored in the user information DB 144. In the user information table, a user ID, user information, and a profile photo ID are associated with each other. For example, the user A has a user ID of 10000, user information indicating a name, a company name, and a department name, a profile photo ID of 20000, and the like. The entity of the profile photo is stored in the profile photo DB 145 together with the profile photo ID. The user information DB 144 stores each photo ID of the corresponding one of the profile photos of the message-transmission-source user in the table in association with one of the message-transmission-destination users, the photo profile being adaptively decided according to the rule (described later).

FIG. 5 illustrates examples of profile photos 20 of the user A. As the profile photos 20 of the user A, three profile photos 20 categorized as the following are present:

Default;
Profile photo 1; and
Profile photo 2.

These profile photos 20 are stored in the profile photo DB 145 in such a manner that the user A transmits (uploads) the profile photos 20 to the chat service server 14 by operating the user terminal 10A. The photos in this example are as follows.

Default: general photo
Profile Photo 1: More Formal Photo
Profile photo 2: more casual photo However, the photos are not limited to these. A profile photo may include not only a photo taken with a camera but also an image generated by computer graphics (CG).

The profile photos 20 are prepared to perform communication smoothly and promote the communication between the message-transmission-source user and the message-transmission-destination user in accordance with a human relationship between them by changing the profile photos on the basis of the user information regarding the message-transmission-destination user.

That is, it is not appropriate to display a private and casual photo as the profile photo of the user A without variation to a user terminal operated by an outside user with whom the user A does not have an experience of communication. In contrast, it is not appropriate to display a formal unexpressive photo as the profile photo of the user A without variation on a user terminal operated by a business partner close to the user A. Both of the displaying possibly hinders smooth communication. The multiple profile photos 20 are prepared from this viewpoint. As a matter of course, the profile photos 20 are the profile photos of the user A and thus are required to be identifiable as the user A by the message-transmission-destination user looking at the profile photos.

Figure 6:
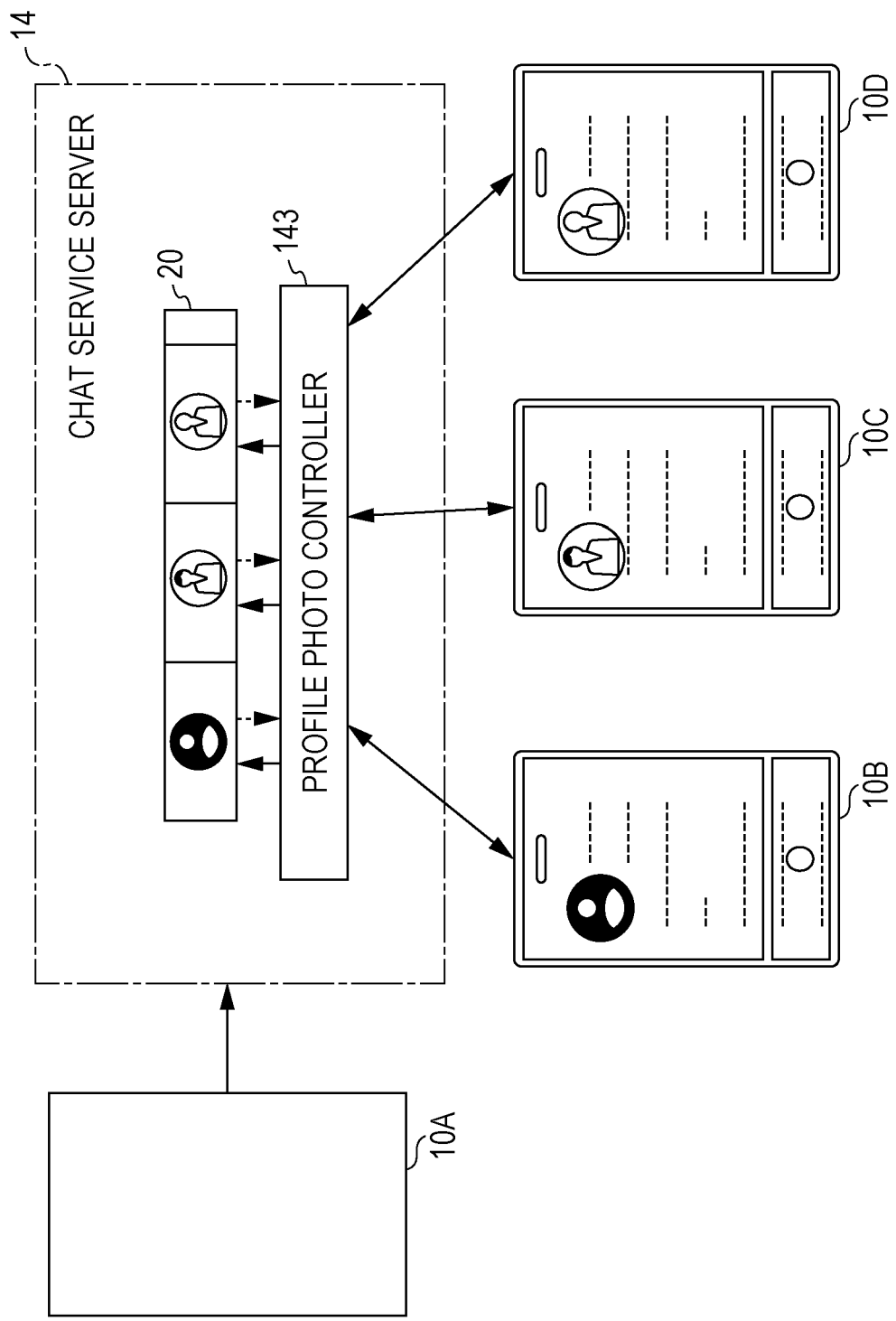
FIG. 6 is a view for explaining the changing of the profile photos according to the exemplary embodiment.

FIG. 6 schematically illustrates changing control performed by the profile photo controller 143 in a case where a message is transmitted from the user terminal 10A operated by the user A to the user terminals 10B, 10C, and 10D respectively operated by the users B, C, and D.

The user terminal 10A transmits the message to the chat service server 14. The profile photo controller 143 verifies user information regarding each message-transmission-destination user. The profile photo controller 143 selects one of the profile photos 20 of the user A according to a rule and provides the transmission-destination user with the profile photo. For example, the rule specifies the following as illustrated in FIG. 6.

User terminal 10B operated by the user B: Default
User terminal 10C operated by the user C: Profile photo 1
User terminal 10D operated by the user D: Profile photo 2

Note that although the message-transmission-source user is one user who is the user A, the profile photo of the user A varies depending on the message-transmission-destination user. This denotes that the profile photo of the user A dynamically varies with a relationship between the user A and the user B, between the user A and the user C, or between the user A and the user D.

When receiving the message from the user terminal 10A, the profile photo controller 143 may select profile photos to be provided to the respective user terminals 10B, 10C, and 10D. However, the profile photo controller 143 may receive a profile photo acquisition request from each of the user terminals 10B, 10C, and 10D as the message transmission destinations and select a profile photo to be provided to a corresponding one of the user terminals 10B, 10C, and 10D in response to the profile photo acquisition request.

For example, processing is performed in the following steps on the user terminal 10B taken as an example:

(1) receiving a message from the user terminal 10A;
(2) identifying the user B as the message transmission destination of the message;
(3) transmitting the message to the user terminal 10B;
(4) receiving a profile photo acquisition request from the user terminal 10B;
(5) acquiring user information regarding the user B from the user information DB 144;
(6) acquiring a rule from the rule DB 146;
(7) selecting one of the profile photos 20 according to the rule;
(8) storing the photo ID of the selected profile photo and the user ID of the user B in association with each other in the association table in the user information DB 144; and
(9) transmitting the selected profile photo to the user terminal 10B.

The profile photo controller 143 performs the steps for each message-transmission-destination user in accordance with the program.

Profile Photo Selection Rules

Rules used for the profile photo changing control performed by the profile photo controller 143 will then be described.

Figures 7, 8:
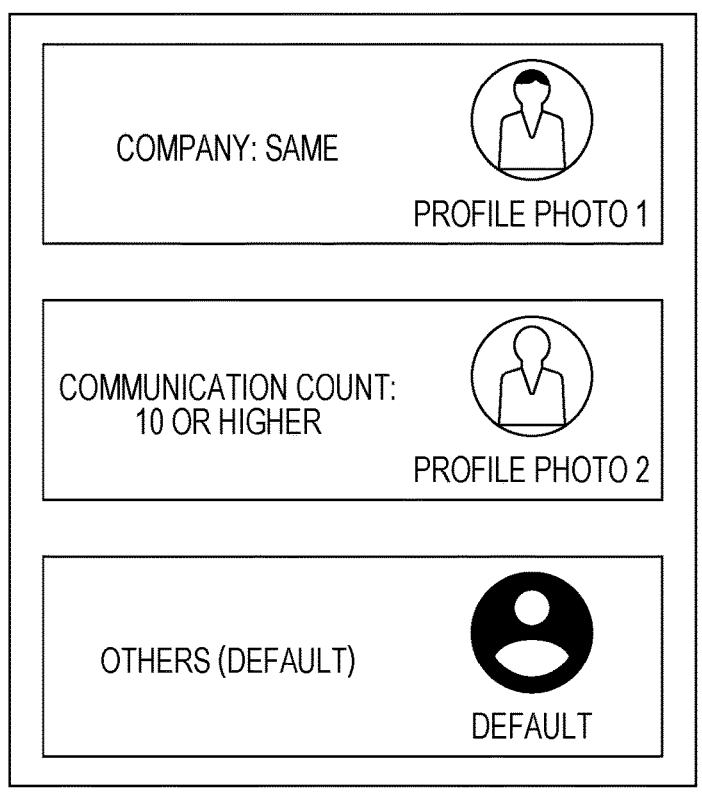
FIG. 7 is a table for explaining rules according to the exemplary embodiment (No. 1)
FIG. 8 is a view for explaining the rules according to the exemplary embodiment (No. 2)

FIG. 7 illustrates an example rule table stored in the rule DB 146. Each rule is composed of Item, Condition, and Profile photo.

Item includes Company, Department, and Communication count. Company and Department respectively represent a company and a department to which the user belongs. Communication count represents the number of times a message is transmitted or received between the users, that is, the number of times a message is transmitted or received between a specific transmission-source user and a specific transmission-destination user. If the users serve as nodes, and if the nodes are connected using links, the number of times communication is performed may be counted on a per-link basis. Specifically, for example, the numbers of times are as follows.

Link between the user A and the user B: one
Link between the user A and the user C: two
Link between the user A and the user D: zero The number of times communication is performed is also stored in the user information DB 144.

Condition is provided on a per-item basis. Same and Different are provided for each of Company and Department, and ≥Threshold and <Threshold are provided for Communication count.

As Profile photo, one of Default, Photo (profile photo) 1, and Photo (profile photo) 2 is set for each of Company and Department according to Condition.

Specifically, the profile photo is set on the basis of the following.

Same company: Profile photo 1
Different companies: Default
Same department: Profile photo 2
Different departments: Default
Communication count higher than or equal to a threshold: Profile photo 2
Communication count lower than the threshold: Default Suppose an example case where a message is transmitted from the user terminal 10A operated by the user A to the user terminal 10B operated by the user B. If the user A and the user B belong to the same company, Profile photo 1 is set as the profile photo of the user A for the user terminal 10B. If the number of times the user A and the user B perform communication is higher than or equal to the threshold (for example, ten), Profile photo 2 is set as the profile photo of the user A for the user terminal 10B.

The rules may be used after being selected but may also be used in combination. If the rules are used in combination, the relationship between the user A and the user B is likely to apply to more than one rule of the rules illustrated in FIG. 7 on occasions. In an example case, the user A and the user B belong to the same company, and the number of times communication is performed is lower than the threshold.

For such a case, priority may be given to the rules. Any priority may be given. For example, suppose that such priority as Company<Department<Communication count is given from the lowest. If the user A and the user B belong to the same company, and if the number of times communication is performed is lower than the threshold, Default is set for the profile photo of the user A. If the user A and the user B belong to the same company but different departments, Default is set for the profile photo of the user A. The priority may be set in advance by the chat service server 14 or by the user A individually by operating the user terminal 10A.

FIG. 8 schematically illustrates the profile photo changing control performed according to the rules in a case where Company and Communication count are used as Item.

If the user A and the user B belong to the same company, Profile photo 1 is selected as the profile photo of the user A and displayed on the user terminal 10B.

If the number of times the user A and the user B perform communication is higher than or equal to ten, Profile photo 2 is selected as the profile photo of the user A and displayed on the user terminal 10B.

In other cases, that is, if the user A and the user B belong to respective different companies, and if the number of times the user A and the user B perform communication is lower than ten, the profile photo set as Default is displayed as the profile photo of the user A.

If the user A and the user B belong to the same company, and if the number of times the user A and the user B perform communication is higher than or equal to ten, Profile photo 2 is selected as the profile photo of the user A according to the priority and displayed on the user terminal 10B. However, this is not illustrated in FIG. 8.

The rules may be set in advance not only by the chat service server 14 but also by a user of the chat service individually. A case where the user A serving as the message-transmission-source user sets rules individually will be described.

Figure 9A:
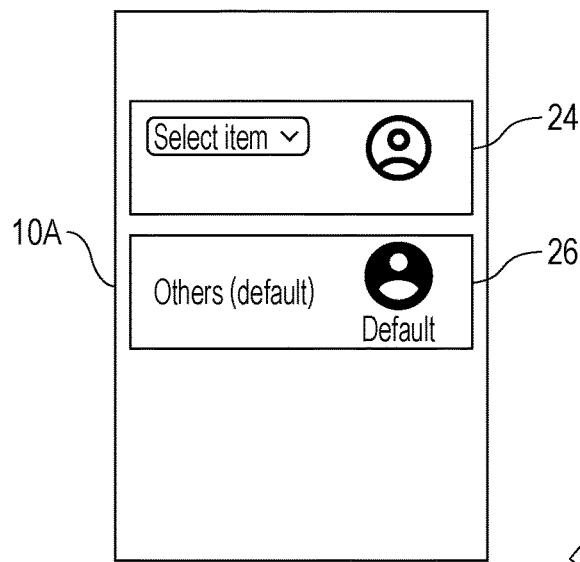
FIGS. 9A, 9B, and 9C are views for explaining rule setting according to the exemplary embodiment.
Figure 9B:
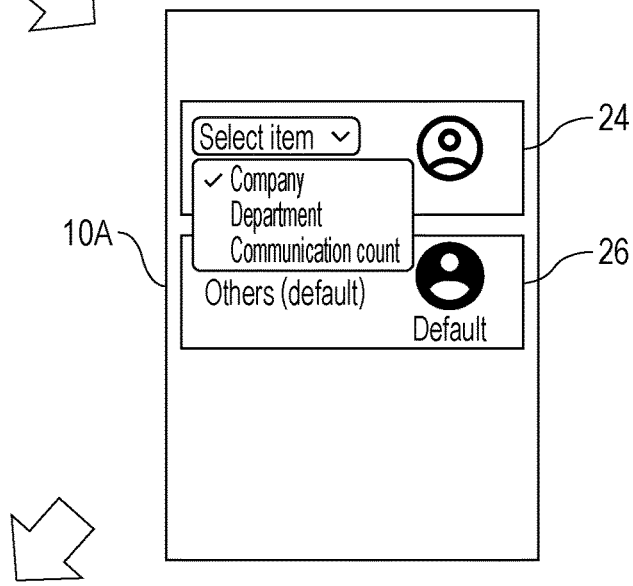
Figure 9C:
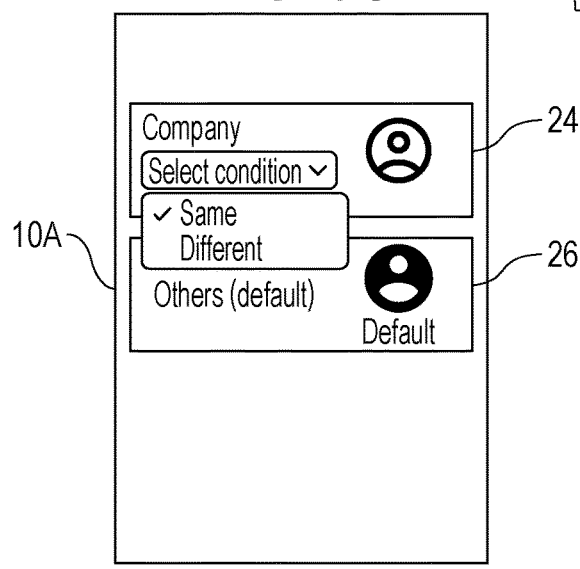

FIGS. 9A, 9B, and 9C illustrate an example rule setting screen displayed on the user terminal 10A operated by the user A. The operation screen transitions in order from FIG. 9A to FIG. 9B, and further to FIG. 9C.

FIG. 9A illustrates the initial state of the rule setting screen. An area 24 for setting Item and Condition and an area 26 for setting others are displayed on the user terminal 10A. In the area 24, a profile photo intended to be set according to a set rule is displayed. Specifically, if a rule for Profile photo 1 is set, Profile photo 1 is displayed. In contrast, in the area 26, a profile photo as Default is displayed as a profile photo for the other cases.

To set Item and Condition, the user A operates the Select item menu. In response to this, the screen transitions to that in FIG. 9B, and the pull-down menu for Item is displayed.

FIG. 9B illustrates a state where the pull-down menu for Item is displayed. Company, Department, and Communication count are displayed as Item in the menu. The user A may select an intended item from these.

If the user A selects Company, the screen transitions to that in FIG. 9C, and a Select condition pull-down menu for the selected item is displayed.

FIG. 9C illustrates a state where the pull-down menu for Condition is displayed. Same and Different are displayed as Condition in the menu. The user A may select an intended condition from these.

If the user A selects Same, one rule is set. In this case, the rule specifies

Same company: Profile photo 1.

The set rule is stored in the rule DB 146 together with the user ID of the user A who sets the rule.

In a state where Profile photo 2 is displayed in the area 24, Department and Same are respectively selected from Item and Condition in the same manner, and thereby the following rule is set.

Same Department: Profile Photo 2

The case where the user A sets the rules has heretofore been described with reference to FIGS. 9A to 9C. However, the user A may set a rule for each message-transmission-destination user individually. Specifically, the user A sets a profile photo by selecting the profile photo to be displayed on a per message-transmission-destination user basis.

FIGS. 10A and 10B illustrate a different example rule setting screen displayed on the user terminal 10A operated by the user A. The operation screen transitions from FIG. 10A to FIG. 10B.

FIG. 10A illustrates the initial state, and a list of users who use the chat service is displayed. The user A serving as the message-transmission-source user selects, from the list, a user for whom the profile photo of the user A is set. In FIG. 10A, User A and User B are selected and thus are checked. However, User A is conveniently different from the user A described so far.

FIG. 10B illustrates a screen after the transition and for selecting a profile photo of the user A for the selected user. Since User B is selected in FIG. 10A, a profile photo is selected for User B. For example, if the user A is to communicate with User B for the first time, the profile photo as Default is considered to be appropriate, and thus Default is selected. In FIG. 10B, Default is checked. The following rule is set through the operations above.

User B: Default

The set rule is stored in the rule DB 146 together with the user ID of the user A who sets the rule.

In this manner, the profile photo of the message-transmission-source user is subjected to the changing control according to the set rule and displayed on the user terminal of the message-transmission-destination user. However, even in the case of the same combination of the message-transmission-source user and the message-transmission-destination user, the profile photo may vary. Examples thereof include the following case. Specifically, if the company or the department of the message-transmission-destination user is changed due to carrier change, transfer, or the like, the number of times communication is performed is increased and reaches the threshold from the number of times lower than the threshold.

Figure 11:
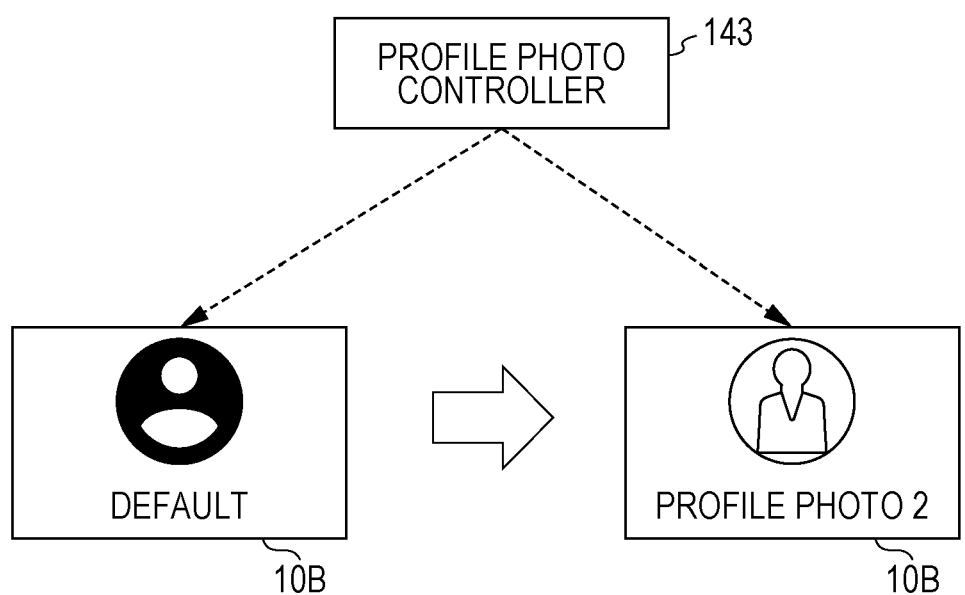
FIG. 11 is a view for explaining the automatic changing of the profile photos according to the exemplary embodiment.

FIG. 11 illustrates a state where a profile photo is changed to a different profile photo at a specific time after the different profile photo is selected according to the rule. For example, in a case where the user A transmits a message to the user B, the Default profile photo of the user A is displayed on the user terminal 10B at a certain time. However, at a different time, (for example, because the number of times communication is performed reaches ten), Profile photo 2 of the user A is displayed on the user terminal 10B.

In this case, the profile photo of the user A is changed from the Default profile photo to Profile photo 2, and a casual profile photo is displayed on the basis of a large number of times communication is performed. The user B thus feels closer to the user A, and smoother communication is to be performed. However, it is not appropriate for the user A not to know which one of the profile photos of the user A is displayed to the user B.

Hence, in a case where the profile photo changing control is performed according to a rule, the profile photo controller 143 inquires of the message-transmission-source user whether to change the profile photo. Specifically, suppose a case where the number of times communication is performed reaches ten from nine after the user A transmits a message to the user B. In this case, in response to the decision of changing the profile photo of the user A from the Default profile photo to Profile photo 2 according to the rule, the profile photo controller 143 transmits an inquiry message to the user terminal 10A via the communication unit 141. For example, the following inquiry message is transmitted.

"Do you change profile photo to Profile photo 2?"

Figure 12:
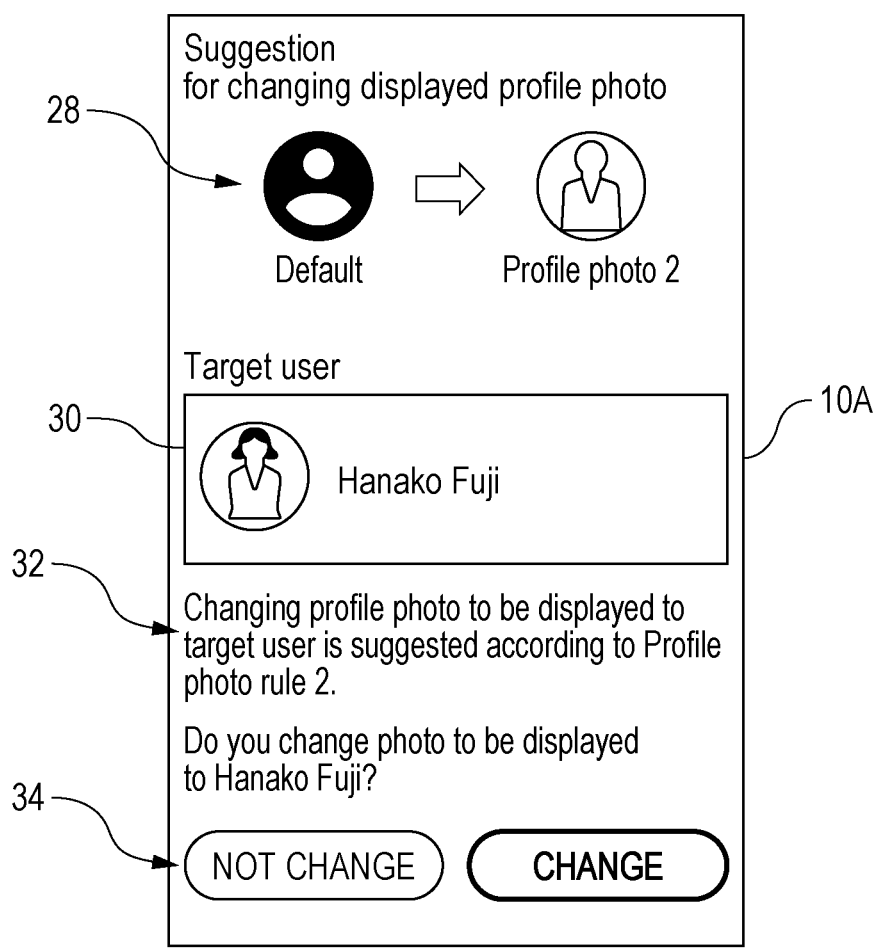
FIG. 12 is a view for explaining a screen of a user terminal according to the exemplary embodiment (No. 1)

FIG. 12 illustrates an example inquiry message displayed on the user terminal 10A. Profile photos before and after the change, that is, the Default profile photo and Profile photo 2 are displayed in an area 28, and the message-transmission-destination user is displayed as a target user in an area 30. A message indicating that the profile photo is to be changed according to the rule and a message indicating whether to change the profile photo are displayed in an area 32. Together with the inquiry message, buttons 34 respectively representing:

Not change; and

Change are displayed.

The user A checks the inquiry message as described above and thereby may easily recognize that the profile photo of the user A to be displayed to the message-transmission-destination user is changed from the Default profile photo to Profile photo 2.

In this exemplary embodiment, the changing control of the profile photo of the message-transmission-source user is performed on the basis of the user information regarding the message transmission destination, and the profile photo varies with the message-transmission-destination user. It is thus appropriate for the message-transmission-source user to easily recognize association between each message-transmission-destination user and a corresponding one of the profile photos that is selected and to be displayed.

Figure 13:
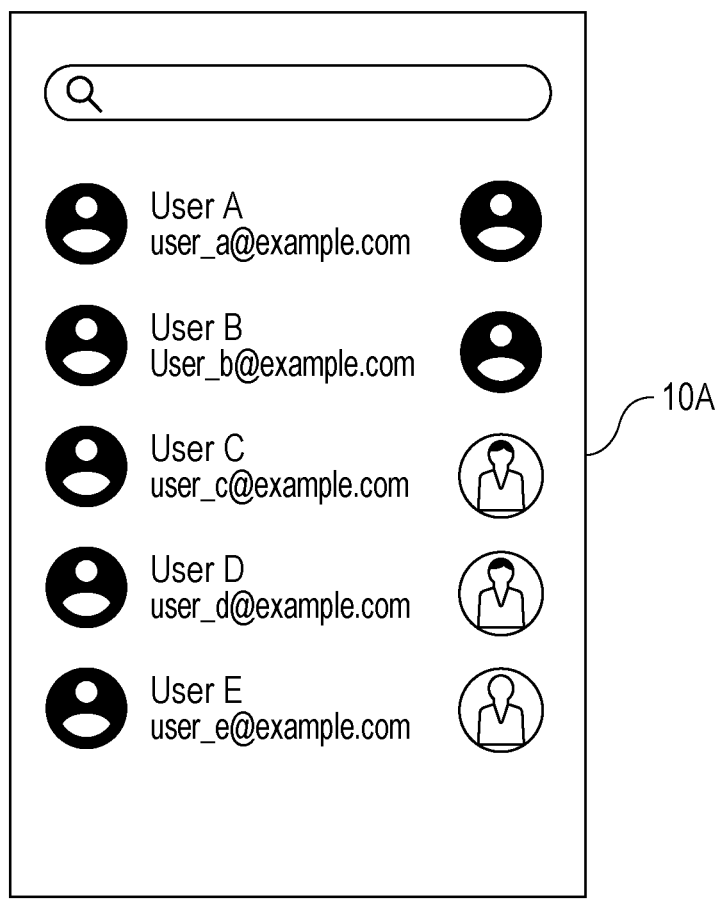
FIG. 13 is a view for explaining a screen of the user terminal according to the exemplary embodiment (No. 2)

FIG. 13 illustrates a screen for a list of profile photos for the respective message-transmission-destination users, the screen being displayed on the user terminal 10A serving as the message-transmission-source user. For each message-transmission-destination user, one of the Default profile photo, Profile photo 1, and Profile photo 2 that is set at present according to the rule is displayed. For example, suppose a case where Default is set for User B because, for example, the company is different. In this case, the Default profile photo is displayed in association with User B. Suppose a case where Profile photo 2 is set for User C because the number of times communication is performed is 12. In this case, Profile photo 2 is displayed in association with User C.

To display the screen in FIG. 13, the profile photo controller 143 refers to the table of associations between the user ID and the profile photo ID stored in the user information DB 144, detects setting associations between a user and a profile photo, and provides the screen to the user terminal 10A.

Figure 14:
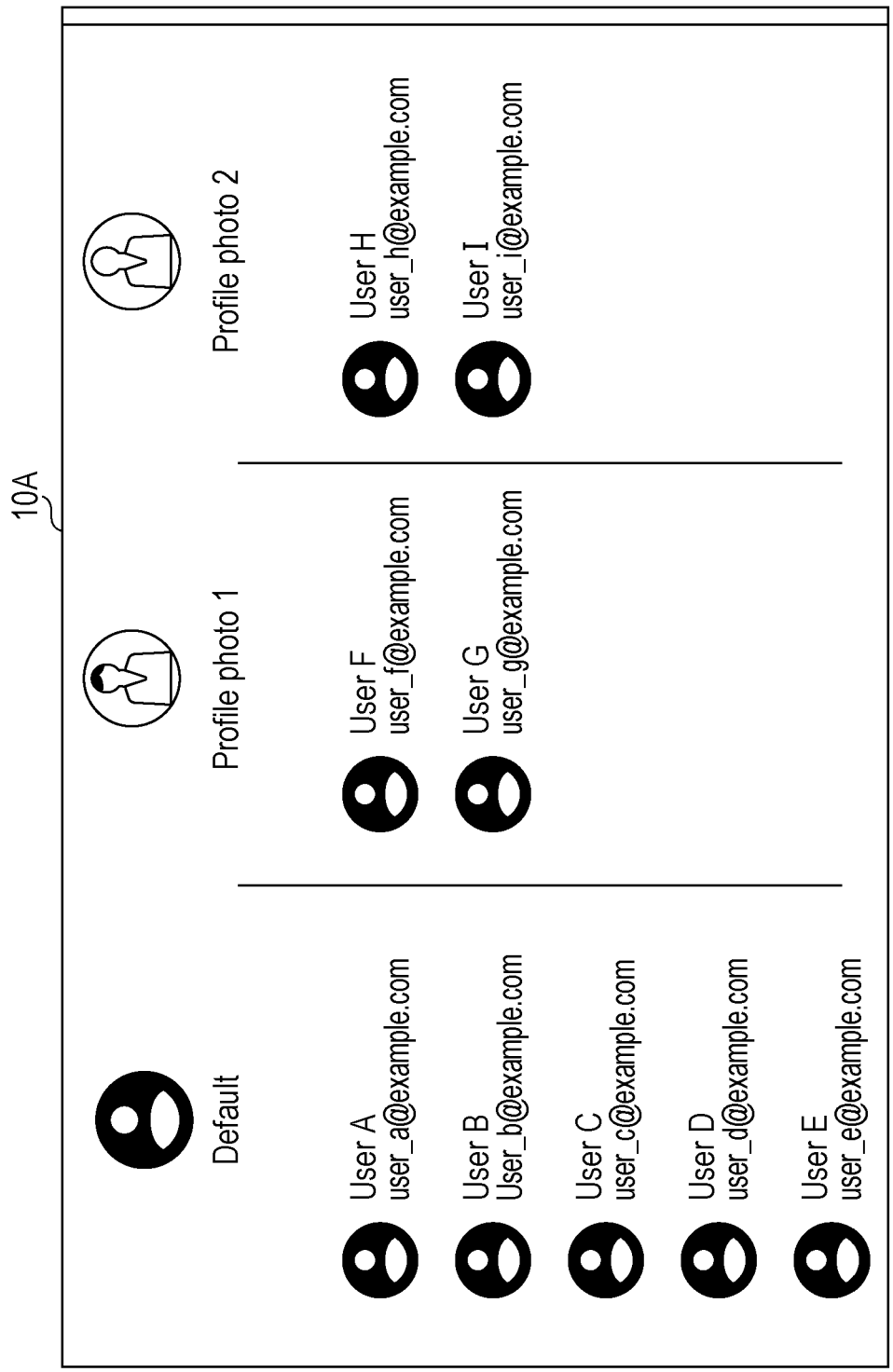
FIG. 14 is a view for explaining a screen of the user terminal according to the exemplary embodiment (No. 3)

FIG. 14 illustrates a screen for a list of message-transmission-destination users displayed on a per profile photo basis on the user terminal 10A serving as the message-transmission-source user. As users assigned Default, User A, User B, User C, User D, and User E are displayed in the list. As users assigned Profile photo 1, User F and User G are displayed in the list. As users assigned Profile photo 2, User H and User I are displayed in the list.

To display the screen in FIG. 14, like the case in FIG. 13, the profile photo controller 143 refers to the table of associations between the user ID and the profile photo ID stored in the user information DB 144, detects setting associations between a user and a profile photo, and provides the screen to the user terminal 10A.

With the screen in the FIG. 13, which of the profile photos is set may be easily recognized using a user as a key. With the screen in FIG. 14, which of the users is set may be easily recognized using a profile photo as a key. One of the respective screens in FIGS. 13 and 14 may be selected and displayed in such a manner as to be changed from one to the other.

Figure 15:
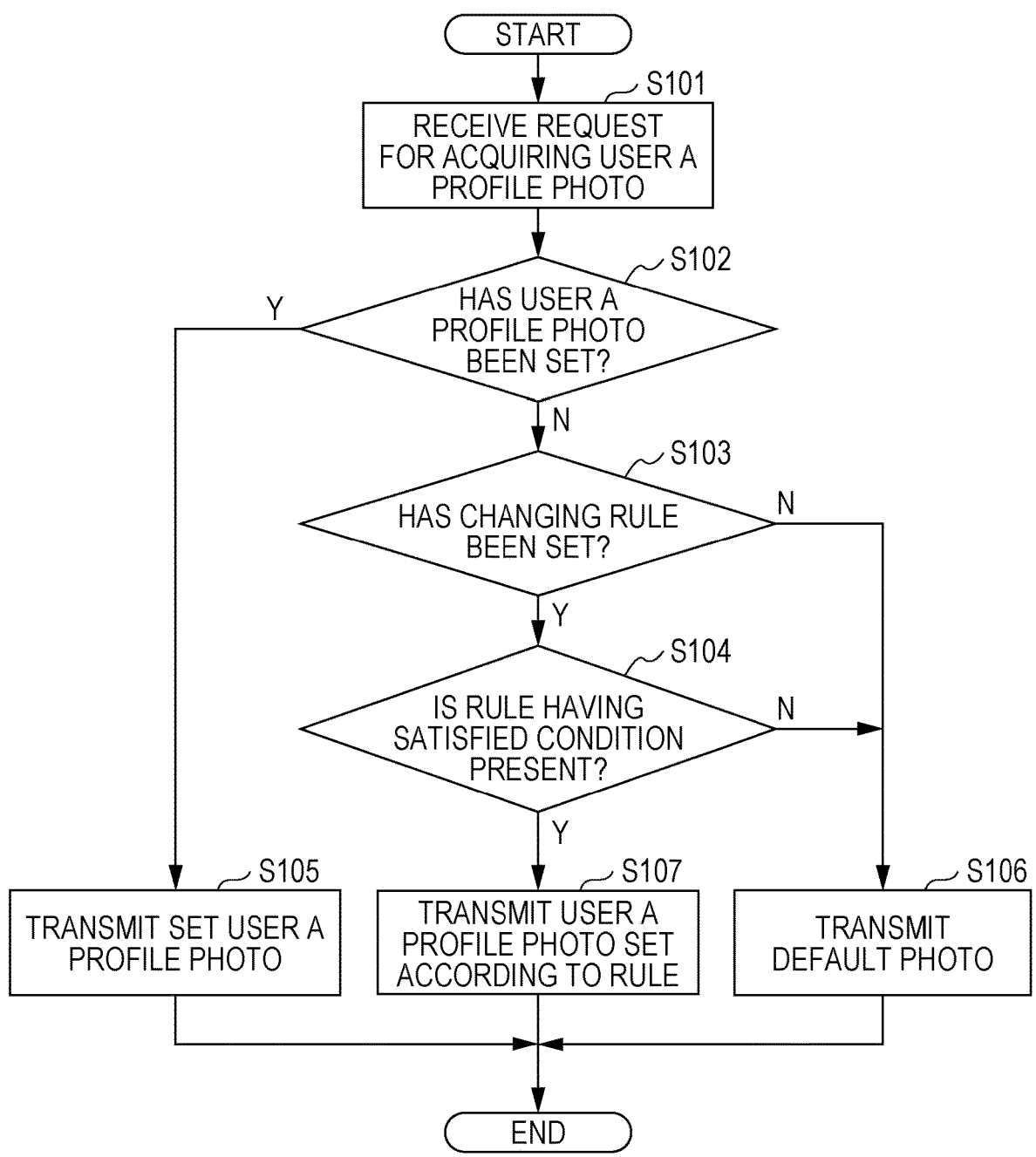
FIG. 15 is a processing flowchart according to the exemplary embodiment.

FIG. 15 is a processing flowchart of this exemplary embodiment and illustrates processing by the CPU 14b of the chat service server 14 performed in the case where the user A transmits a message to the user B.

In response to receiving a message from the user terminal 10A, the CPU 14b identifies the user B serving as the message-transmission-destination user and transmits the message to the user terminal 10B. In addition to this, the CPU 14b receives an acquisition request for a profile photo of the user A, the acquisition request being transmitted from the user terminal 10B (S101).

In response to receiving the acquisition request for a profile photo of the user A, the CPU 14b accesses the user information DB 144 and determines whether the user A has fixed a profile photo of the user A (S102). If the user A has fixed a profile photo of the user A (YES in S102), the CPU 14b reads out the fixed profile photo set in advance from the profile photo DB 145 without referring to the rule and transmits the profile photo back to the user terminal 10B (S105). The step is performed in consideration for a possible case where the user A does not intend automatic changing of the profile photo.

If the user A has not fixed a profile photo of the user A (NO in S102), the CPU 14b accesses the rule DB 146 and determines whether a changing rule has been set (S103). If a changing rule has not been set (NO in S103), the CPU 14b selects a Default profile photo from among the profile photos of the user A, reads out the Default profile photo from the profile photo DB 145, and transmits the Default profile photo back to the user terminal 10B (S106).

If a changing rule has been set (YES in S103), the CPU 14b accesses the rule DB 146 and determines whether a rule having a condition satisfied in the user information regarding the user B is present (S104). Note that the changing rule includes a rule set in advance by the chat service server 14 and a rule set by the user A individually.

If a rule having a condition satisfied in the user information is not present (NO in S104, for example, Others in FIG. 8 applies), the CPU 14b selects a Default profile photo from among the profile photos of the user A, reads out the Default profile photo from the profile photo DB 145, and transmits the Default profile photo back to the user terminal 10B (S106).

In contrast, if a rule having a satisfied condition is present (YES in S104), the CPU 14b selects a profile photo of the user A set in the rule, reads out the profile photo from the profile photo DB 145, and transmits the profile photo back to the user terminal 10B (S107).

The exemplary embodiment of the present disclosure has heretofore been described. However, the present disclosure is not limited to the exemplary embodiment, and various modifications may be made to the exemplary embodiment. Hereinafter, modifications will be described.

Modification 1

In the exemplary embodiment, the changing control of the profile photo is performed on the basis of the number of times the user performs communication, the number of times serving as the user information. Instead of or in addition to this, the changing control of the profile photo may be performed on the basis of the user's communication period serving as the user information. The term "communication period" denotes a period from a start date to the present. The start date is a date when users perform communication (including both of a date when one of the users transmits a message and dates when the users transmit messages). Examples of a rule using the communication period include the following provided on the basis of, for example, how long the communication period is.

Communication period shorter than a threshold: Profile photo 2

Communication period longer than or equal to the threshold: Profile photo 1.

A rule in which the number of times communication is performed and the communication period are combined may be used. Examples of the rule include the following.

Communication period shorter than the threshold and Communication count higher than or equal to the threshold: Profile photo 2

Communication period longer than or equal to the threshold and Communication count higher than or equal to the threshold: Profile photo 1

Communication period longer than or equal to the threshold and Communication count lower than the threshold: Default Modification 2

In this exemplary embodiment, the changing control of the profile photo of the message-transmission-source user is performed on the basis of the user information regarding the message-transmission-destination user, that is, a user who receives a message. However, the changing control of the profile photo may be performed on the basis of the content of the message in addition to the user information.

Specifically, suppose a case where the user A transmits a message to the user B. If the number of times communication is performed is nine and thus does not reach the threshold, Default is selected according to the described rule. However, in this case, the content of the message is parsed. If the number of times communication is performed is lower than the threshold, but if it is determined that the content applies to a casual pattern, Profile photo 2 is selected in consideration for the content of the message. For example, if the message indicates "How about getting together for lunch?", it is determined that the message applies to a casual pattern, and thus Profile photo 2 is selected.

It may be said that in Modification 2, a predetermined rule is complemented or finely tuned on the basis of the content of the message.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A messaging system comprising:
a memory that stores a plurality of profile photos of a message-transmission-source user, the profile photos being different from each other, and user information; and
a processor configured to, by running a program:
select, in response to a message from the message-transmission-source user, a profile photo from among the plurality of profile photos as a profile photo of the message-transmission-source user on a basis of a relationship between the message-transmission-source user and a message-transmission-destination user indicated in the user information;
display the selected profile photo to the message-transmission-destination user in transmitting a message from the message-transmission-source user.

2. The messaging system according to claim 1,
wherein the processor is configured to: change a profile photo to be selected from among the plurality of profile photos in response to change of the user information.

3. The messaging system according to claim 1,
wherein the user information includes information regarding an organization to which a user belongs, and
wherein the processor is configured to: select the profile photo from among the plurality of profile photos on a basis of whether the message-transmission-source user and the message-transmission-destination user belong to an identical organization or respective different organizations.

4. The messaging system according to claim 2,
wherein the user information includes information regarding an organization to which a user belongs, and
wherein the processor is configured to: select the profile photo from among the plurality of profile photos on a basis of whether the message-transmission-source user and the message-transmission-destination user belong to an identical organization or respective different organizations.

5. The messaging system according to claim 1,
wherein the user information includes a message communication count representing how many times message communication is performed by a user, and
wherein the processor is configured to: select the profile photo from among the plurality of profile photos on a basis of how high the message communication count is.

6. The messaging system according to claim 2,
wherein the user information includes a message communication count representing how many times message communication is performed by a user, and
wherein the processor is configured to: select the profile photo from among the plurality of profile photos on a basis of how high the message communication count is.

7. The messaging system according to claim 1,
wherein the user information includes a message communication period in which a user performs message communication, and
wherein the processor is configured to: select the profile photo from among the plurality of profile photos on a basis of how long the message communication period is.

8. The messaging system according to claim 2,
wherein the user information includes a message communication period in which a user performs message communication, and
wherein the processor is configured to: select the profile photo from among the plurality of profile photos on a basis of how long the message communication period is.

9. The messaging system according to claim 1,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

10. The messaging system according to claim 2,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

11. The messaging system according to claim 3,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

12. The messaging system according to claim 4,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

13. The messaging system according to claim 5,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

14. The messaging system according to claim 6,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

15. The messaging system according to claim 7,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

16. The messaging system according to claim 8,
wherein the processor is configured to: transmit, to the message-transmission-source user, an inquiry message for verifying a profile screen displayed to the message-transmission-destination user, the inquiry message being transmitted after the profile photo is selected from among the plurality of profile photos.

17. The messaging system according to claim 1,
wherein the processor is configured to: present, to the message-transmission-source user, a screen representing, for each of a plurality of message-transmission-destination users, which of the plurality of profile photos is to be displayed to the message-transmission-destination user.

18. The messaging system according to claim 1,
wherein the processor is configured to: present, to the message-transmission-source user, a screen representing, for each of the plurality of profile photos, to which of a plurality of message-transmission-destination users the profile photo is to be displayed.

19. A non-transitory computer readable medium storing a program causing a processor to execute a process comprising:
selecting, in response to a message from a message-transmission-source user, a profile photo from among a plurality of profile photos different from each other, the profile photo being selected as a profile photo of the message-transmission-source user on a basis of a relationship between the message-transmission-source user and a message-transmission-destination user indicated in user information, the profile photo being selected from a memory that stores the plurality of profile photos and the user information; and displaying the selected profile photo to the message-transmission-destination user in transmitting a message from the message-transmission-source user.

20. A messaging method comprising:
selecting, in response to a message from a message-transmission-source user, a profile photo from among a plurality of profile photos different from each other, the profile photo being selected as a profile photo of the message-transmission-source user on a basis of a relationship between the message-transmission-source user and a message-transmission-destination user indicated in user information, the profile photo being selected from a memory that stores the plurality of profile photos and the user information; and displaying the selected profile photo to the message-transmission-destination user in transmitting a message from the message-transmission-source user.

* * * * *